United States Patent [19]

Allaire et al.

[11] Patent Number: 5,225,015
[45] Date of Patent: Jul. 6, 1993

[54] METHOD FOR MAKING STIFFENED CERAMIC MATRIX COMPOSITE PANEL

[75] Inventors: Roger A. Allaire, Big Flats; Thomas P. Grandi, Elmira; Victor F. Janas, Horseheads, all of N.Y.

[73] Assignee: Corning Incorporated, Corning, N.Y.

[21] Appl. No.: 684,862

[22] Filed: Apr. 15, 1991

[51] Int. Cl.⁵ .................... C03B 29/00; B29C 33/76
[52] U.S. Cl. .................... 156/89; 65/18.1; 156/155; 156/285; 264/545; 264/570; 264/316; 264/317
[58] Field of Search .............. 156/89, 155, 285; 264/60, 65, 544, 545, 570, 241, 316, DIG. 44, 317; 65/18.1

[56] References Cited

U.S. PATENT DOCUMENTS

| | | | |
|---|---|---|---|
| 4,666,645 | 5/1987 | Prewo et al. | 156/89 |
| 4,752,313 | 6/1988 | Allaire et al. | 156/89 |
| 4,776,866 | 10/1988 | Chen et al. | 65/33 |
| 4,822,660 | 4/1989 | Lipp | 428/113 |
| 4,909,872 | 3/1990 | Jarmon | 156/89 |
| 4,921,528 | 5/1990 | Allaire et al. | 65/18.1 |
| 4,976,761 | 12/1990 | Allaire | 156/89 |
| 5,057,174 | 10/1991 | Anderson et al. | 264/317 |

*Primary Examiner*—Jan H. Silbaugh
*Assistant Examiner*—Christopher A. Fiorilla

[57] ABSTRACT

An improved method for the fabrication of lightweight ceramic matrix composite panels, utilizing pressure forming with floating tooling to shape integral stiffeners such as raised integral surface channels on panel surfaces. The consolidation of green composite material against refractory floating tools by hot hydrostatic or isostatic (gas) pressing, followed by removal of the tooling, yields a strong, rigid, yet lightweight ceramic structure.

15 Claims, 3 Drawing Sheets

METHOD FOR MAKING STIFFENED CERAMIC MATRIX COMPOSITE PANEL

BACKGROUND OF THE INVENTION

The present invention relates to the manufacture of ceramic matrix composite articles, and more particularly to a method for making a fiber-reinforced ceramic matrix composite panel comprising one or more integral stiffeners which exhibits high rigidity as well as excellent strength.

Several methods for making ceramic matrix composite structures of complex shape are known. U.S. Pat. No. 4,776,866, for example, teaches the fabrication of complex shapes such as honeycomb bodies wherein ceramic batches comprising powdered ceramic material in combination with inorganic whiskers or chopped fibers are extruded as green honeycomb bodies and thereafter fired to consolidate them into dense fiber reinforced ceramics.

U.S. Pat. No. 4,921,528 discloses another fabrication method wherein a fiber-containing feedstock produced by chopping fiber-reinforced glass rods or prepregs is reheated to the softening point of the glass, and thereafter reshaped at high temperatures into the desired product configuration. Depending on the glass viscosity at the shaping temperature, molding, stamping, or forging operations may be used to achieve the final product shape.

Both of the foregoing procedures permit complex shapes to be achieved, but both are limited to the use of chopped fiber materials as the ceramic matrix reinforcement. For many applications, a composite material wherein the fiber reinforcement is provided in the form of long, parallel-aligned fibers or fiber groups is preferred in order to maximize the strength of the body along a preselected axis in the material.

A procedure for fabricating lightweight reinforced ceramic panels incorporating long reinforcing fibers is disclosed in U.S. Pat. No. 4,822,660. That procedure involves combining fiber-reinforced panels with fiber-reinforced channeled ceramic support elements. The support elements are individually formed by wrapping fiber prepreg on refractory mandrels, and then consolidating the wrappings by hot isostatic pressing to provide dense fiber-reinforced hollow supports.

To provide the completed structure, the hollow supports are combined with the panels by a sealing process. Devitrifiable glass cementing compositions are applied to adjoining surfaces of the supports and panels, and these elements are combined into an assembly which is then fired to bond the elements into a strong, stiff, ceramic composite structure.

While the sealing approach of U.S. Pat. No. 4,822,660 provides a product of relatively high strength and stiffness, the sealed joints in the structure may not provide the same level of structural strength and toughness as the panels and support members themselves. Further, the numerous part fabrication and sealing steps required, and particularly the several high temperature steps involved in consolidation and sealing, disadvantageously increase the cost and complexity of the manufacturing process.

Thus, notwithstanding the significant advances in the art of fabricating complex ceramic matrix composite structures, there remains a need for an efficient and low-cost process for making a composite structure which is light in weight yet strong and highly resistant to bending.

It is therefore a principal object of the invention to provide a new method for the fabrication of a ceramic matrix composite plate or panel of high stiffness and strength.

It is a further object of the invention to provide a ceramic matrix composite article comprising integral stiffening means, and a method for making it, offering high strength and bending resistance at reduced cost.

Other objects and advantages of the invention will become apparent from the following description.

SUMMARY OF THE INVENTION

The present invention provides an improved method for the fabrication of ceramic matrix composite panels which are light in weight yet strong and rigid. The method utilizes pressure forming in conjunction with a refractory floating tool as a shaping means in order to provide panels incorporating integral structural stiffeners. Hydrostatic pressing, hot isostatic pressing, or any other hot compressive forming process can be used. The stiffeners are channels or other raised structures formed on the surfaces of the panels during panel consolidation, these being formed through the shaping and consolidation of green composite ceramic sheet which is disposed over or against the floating tool and adjoining surfaces of the panel during the simultaneous consolidation of the panel and stiffeners.

In broad aspect then, the invention first includes a method for the manufacture of a ceramic matrix composite panel incorporating an integral support member, the support member also being composed of ceramic composite material. In accordance with the method, green composite ceramic material for a panel preform and a support preform is first provided, that material being comprised of green ceramic sheet formed of inorganic fibers pre-impregnated with powdered glass.

Also provided is a refractory forming tool, the tool comprising a shaping surface configured for shaping green ceramic sheet into an integral support member having a selected support configuration. For the purpose of the present description this tool is termed a "floating" tool in that it is typically not connected to any external means for controlled mechanical force application or movement. Often the tool is largely surrounded by ceramic material, and acts to shape that material only as the material and tool are forced together by pressure applied in the later course of the manufacturing process.

The panel preform, support preform, and floating tool thus provided are next combined into an assembly wherein at least a portion of the support preform is in contact with the surface of the panel preform, and wherein the shaping surface of the floating tool is in contact with at least a portion of the support preform. Typically, the tool at this stage will be positioned to fix the support preform in approximately the location and configuration selected for the integral support member to be provided.

The selection of the configuration for the integral support will of course depend upon the intended use for the composite panel. Raised rib supports and closed channel supports of angular or cylindrical bore cross-section, using one or a multiplicity of support preforms and floating tools, are examples of support structures which may conveniently be provided.

Following the positioning of the support preform and tooling, the entire assembly is heated to a temperature at least sufficient to soften the powdered glass in the green ceramic sheet, and pressure, preferably isostatic or hydrostatic pressure, is applied. The pressure applied to the assembly will be at least sufficient to fuse the support preform to the panel preform, to shape the support preform against the floating tool into an integral support member of the selected support configuration, and to consolidate the fused panel preform and support preform into dense composite ceramic material.

At the conclusion of the consolidation process, the floating tool is removed from the consolidated structure, removal being by conventional chemical or mechanical means. The resulting product is a lightweight but rigid fiber-reinforced composite panel comprising a fiber-reinforced ceramic composite support member as an integral part of the panel structure. Advantageously, only a single consolidation cycle and no ceramic seals or seal processing are required.

DESCRIPTION OF THE DRAWINGS

The invention may be further understood by reference to the drawings wherein.

DETAILED DESCRIPTION

The presently preferred configuration for a composite panel provided in accordance with the invention is one wherein the integral support member is a open-ended channel structure integrated into the panel surface. The channel walls will be composed of fiber-reinforced ceramic material and integrally incorporated into the fiber-reinforced ceramic material making up the structure of the supporting composite panel.

Figure 1:
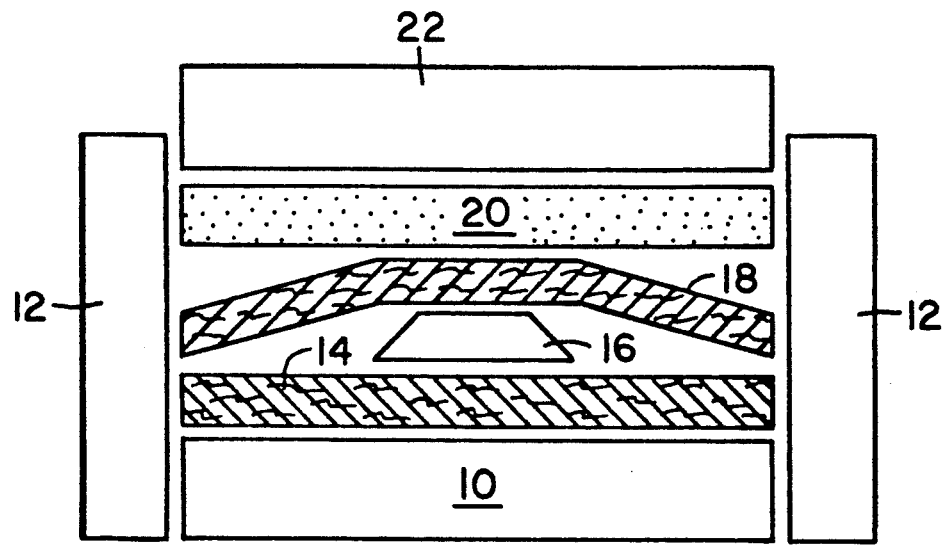
FIG. 1 schematically illustrates a tool and preform sheet assembly for providing an integrally stiffened composite panel in accordance with the invention.

FIG. 1 of the drawing shows an assembly of preform sheets and tooling suitable for the fabrication of a ceramic matrix composite panel with an integral channeled support on the panel surface. As illustrated in FIG. 1, a rigid refractory panel former consisting of a mold insert 10 is positioned within surrounding mold sidewalls 12, and a panel preform 14 consisting of a green ceramic sheet formed of inorganic fibers infiltrated with powdered glass is positioned on insert 10.

A refractory floating tool 16 is placed on panel preform 14 and then a support preform 18, also consisting of a green ceramic sheet formed of inorganic fibers infiltrated with powdered glass, is positioned over the panel preform and tool. During consolidation of these sheets, contact between the support preform 18 and at least those portions of panel preform 14 adjoining the the location for the panel support is needed in order to assure good integration of the two preforms in the final product. Therefore a substantial (in this case complete) overlap of the panel preform by the support preform is provided in the embodiment shown. The cross-sectional shape of floating tool 16 is shown for illustration as that of a trapezoid, in order that a channel bore shape of trapezoidal cross-section will be generated in the completely formed panel support member.

The assembly consisting of the panel preform, floating tool, and support preform is next consolidated by hot pressing, preferably under isostatic pressure, in order to achieve good fusion and densification of the preforms, and conformance of the support preform to the floating tool. The particularly preferred procedure for consolidation is to place a block 20 of a hydrostatic pressure medium in covering contact with the assembly in the mold cavity. This medium is typically a heat-softenable material, normally a room temperature solid, which can soften and flow to transmit hydrostatic pressure to the assembly at the temperatures selected for consolidating the composite preform materials. The high-temperature flow characteristics of this material are sufficient that conditions approximating isostatic pressure are achieved.

After all components have been positioned in the molding cavity, an upper press block consisting of a mold plunger 22 is placed in the mold cavity. Plunger 22 provides the mechanical means for transmitting pressure to the hydrostatic pressure medium as the mold and contents are heated, e.g., in a hot press, to consolidate the assembly. The press may be a simple uniaxial hot press since the hydrostatic pressure medium 20 effectively converts uniaxial pressure applied to the mold plunger 22 to substantially isostatic pressure on preforms 14 and 18 and floating tool 16.

Figure 2:
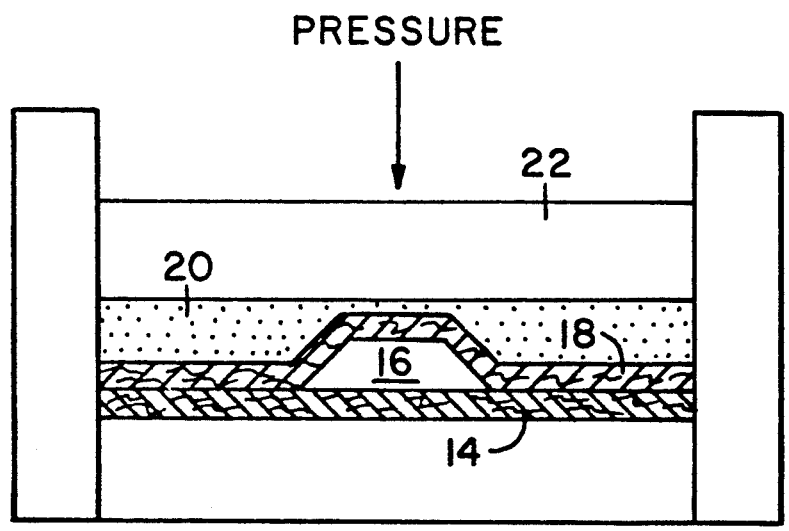
FIG. 2 schematically illustrates the consolidation of a composite panel using the assembly of FIG. 1.

The effect of hot pressing on an assembly such as shown in FIG. 1 is schematically illustrated, not in true proportion or to scale, in FIG. 2 of the drawing. As shown in FIG. 2, uniaxial pressure on plunger 22 results in good fusion and consolidation of preforms 14 and 18 as well as good conformance of support preform 18 to the shape of floating tool 16 from the hydrostatic pressure applied by pressure medium 20.

Figure 3A:
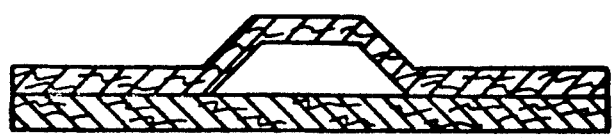
FIGS. 3a-3c illustrate composite panels with integral stiffeners which may be produced in accordance with the invention.

Following the consolidation of the assembly as shown in FIG. 2, the fiber-reinforced composite thus provided is removed from the mold cavity and floating tool 16 is removed from the composite. Removal is typically by mechanical means such as drilling, although depending on tool configuration and/or composition other mechanical means such as pressing or chemical means such as solution extraction may be used. The finished panel with integral support produced in accordance with this procedure is schematically shown in FIG. 3(a) of the drawing.

The composition of the tooling used to provide the floating tool and associated mold inserts, plungers, cavity members and other forming components is not critical. Essentially any refractory material or combination of materials having good release characteristics against fused glass and ceramic materials may be used, although at present the material preferred for the fabrication of tooling to be used in the described method is graphite.

In addition to suitable refractoriness and release qualities, graphite can be shaped to provide tooling having surface configurations adapted to the fabrication of a variety of different product configurations. Hence, although in the embodiment shown in FIGS. 1 and 2 a flat mold insert for panel support and shaping is shown, it will be readily appreciated that appropriate refiguring of the insert and floating tool will yield panels of simple or complex curved configuration, as desired.

The support members integrated as stiffening structures into composite panels provided in accordance with the invention may also vary in configuration to meet the needs of the particular panel application. Illustrative examples of types of integral support structures are schematically shown in cross-sectional elevational view in FIGS. 3a-3c of the drawing and include, in addition to the trapezoidal configuration of FIG. 3a, a rib structure as in FIG. 3b and a triangular channel as in FIG. 3c.

Figure 3B:
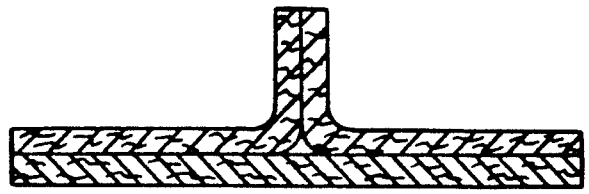
Figure 3C:
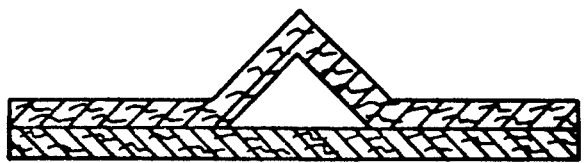
Figure 4A:
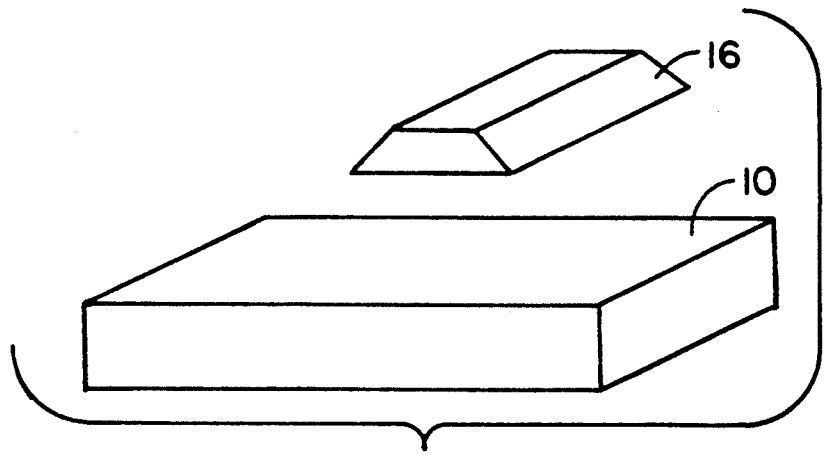
FIGS. 4a-4c illustrate tool designs for the manufacture of composite panels such as shown in FIGS. 3a-3c in accordance with the invention.
Figure 4B:
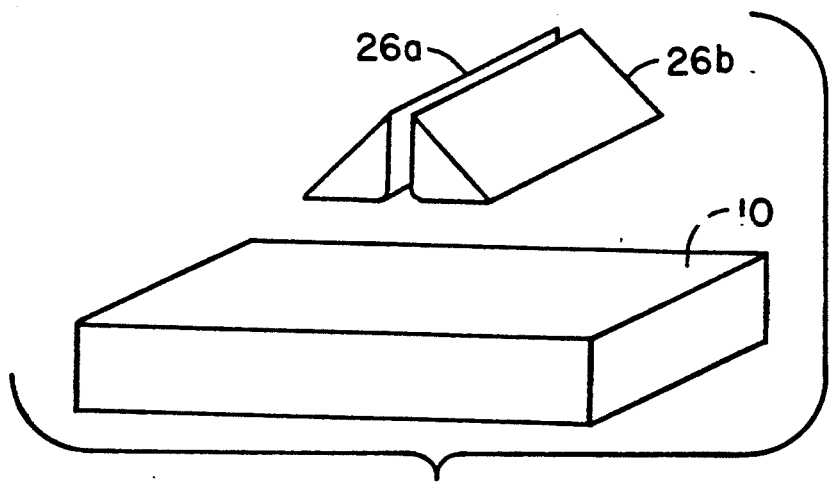
Figure 4C:
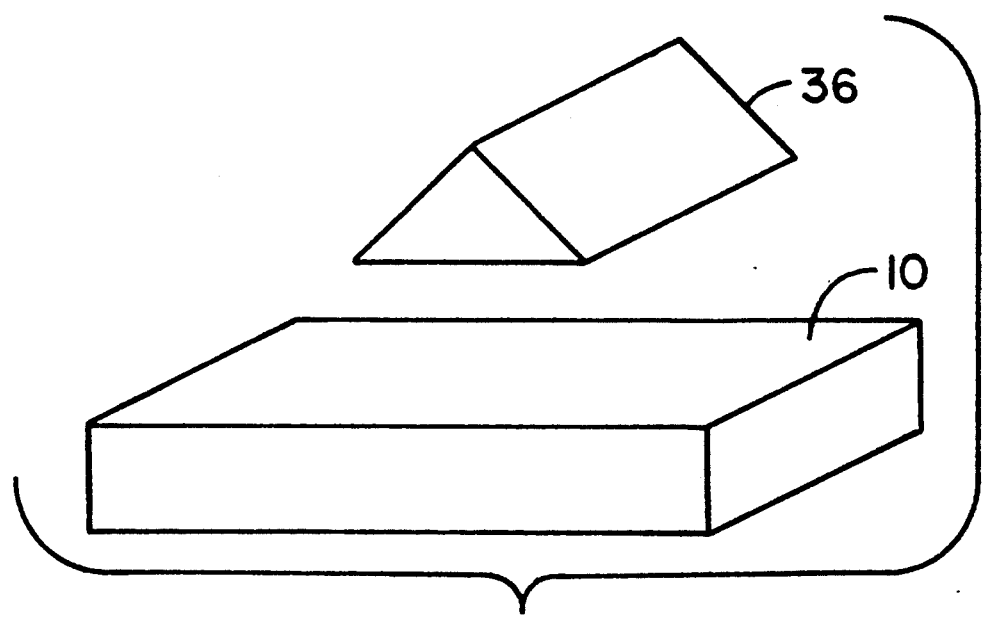

Floating tool designs adapted for the production of panels incorporating the support structures shown in FIGS. 3a-3c are illustrated in FIGS. 4a-4c of the drawing. In addition to the trapezoidal tool set of FIG. 4a, which includes flat mold insert 10 and floating tool 16 of trapezoidal cross-section, there are shown floating tools for shaping the rib and triangular supports of FIGS. 3b and 3c. FIG. 4b shows floating tool set 26a-26b for shaping a vertical rib support while FIG. 4c shows a triangular tool 36 for forming a triangular channel support.

The consolidation of stiffened panel elements in accordance with the invention will, as previously noted, generally require the application of isostatic or substantially isostatic pressure to the preform assembly. Conventional isostatic pressing or so-called HIPping processes are useful and may be preferred for the fabrication of very large parts. However, our preferred practice for smaller part configurations is hot pressing with the aid of a hydrostatic pressure forming medium, as described and shown in FIG. 1. The particularly preferred hydrostatic pressure forming medium for this procedure is a medium composed at least predominantly of a mixture of glass and particulate graphite, the mixture being a solid at room temperature but flowable at the consolidation temperatures customarily used for composite forming.

The selection of glasses and fibers for the green ceramic sheet to be used to provide the panel and support preforms for processing as above described is dictated only by the intended use for the panel. It is well known in the art that a wide variety of glasses and glass-ceramics (ceramics made by the controlled crystallization of glasses) may be used for ceramic matrix composite fabrication. Among the various glasses which have been used are borosilicate, aluminosilicate, and boroaluminosilicate glasses, these typically comprising additions of alkaline earth metal and, optionally, alkali metal oxides. The glasses particularly preferred for glass-matrix fiber composites are the more refractory alkaline earth metal aluminosilicate glasses.

The glass-ceramics of known utility for the fabrication of glass-ceramic matrix composites are also found in a large variety of composition systems. Again, the systems generally preferred for achieving high refractoriness are the alkaline earth metal aluminosilicate glass-ceramics, these typically consisting of glass-ceramics wherein a species selected from the group consisting of cordierite, stuffed cordierite, barium osumilite, anorthite, and mixed anorthite/alumina constitutes the principal crystal phase. Alternative silicate glass-ceramic matrix compositions, e.g., aluminosilicate or alkali (lithium) aluminosilicate glass-ceramics comprising quartz or β-spodumene as principal crystal phases also have utility for these composites.

As is also well known, the consolidation of ceramic matrix composites wherein glass-ceramics constitute the matrix material is generally accomplished in coordination with the thermal crystallization of the glass-ceramic. During this process, the precursor glass powder present in the green ceramic preform sheet material is fused and converted to a highly crystalline glass-ceramic in the course of the pressure consolidation of the material. Again, the consolidation/crystallization processes by which these results are obtained are well known and understood in the art.

The selection of a fiber material for incorporation into the panels of the invention is not critical, although fiber types which are available in long fiber or fiber tow lengths of reasonably good textile quality are preferred. Examples of fibers which are amenable to processing in accordance with the invention are fibers of carbon, alumina, B4C, BN, zircon, mullite, spinel or silicon nitride. However the preferred fiber types from the standpoint of both processability and product performance are silicon carbide or silicon oxycarbide fibers. Commercial silicon carbide or oxycarbide fibers, for example Nicalon ® silicon oxycarbide fibers manufactured by the Nippon Carbon Co. of Tokyo, Japan, are examples fibers which are particularly preferred.

The application of the invention to the fabrication of a reinforced ceramic matrix composite panel incorporating an integral panel stiffener in the form of an elongated channel is more particularly illustrated by the following detailed examples.

EXAMPLE 1

Green ceramic material in the form of woven fiber sheet pre-impregnated with powdered aluminosilicate glass is first prepared from fiber tows by conventional processing. The fiber used to make the sheet is Nicalon NLM-202 silicon oxycarbide fiber tow, commercially distributed by the Dow-Corning Corporation of Midland, Michigan. This tow is transported through a suspension of glass powder in a thermoplastic binder in order to infiltrate and coat the tow with the glass powder.

The glass powder used has a composition, in weight percent, of about 39.5% $SiO_2$, 38.5% $Al_2O_3$, 18.4% CaO, 3.0% $ZrO_2$, and 0.485 $As_2O_3$, and has been milled to an average particle size of about 10 microns. For infiltration into the fiber tows, the glass is dispersed in an approximately equal weight of a thermoplastic binder to produce a heat-softenable suspension. The suspension has a composition consisting approximately, in parts by weight, of about 50 parts of powdered glass, 30 parts of fatty alcohol wax (Alfol TM 1418 DDB wax blend, commercially available from the Vista Chemical Company of Houston, Tex.), 10 parts by weight of a styrene-ethylene/butylene block copolymer (Kraton TM G1650 thermoplastic elastomer, commercially available from the Shell Chemical Company of Houston, Tex.), 10 parts by weight of a polybutylene resin plasticizer (Parapol 950 oil additive, commercially available from Exxon Chemicals of Houston, Tex.), and 0.2 parts by weight of a dispersant (Hypermer KD3 dispersing agent, commercially available from ICI Americas of Wilmington, Del.).

The fiber tow is transported through the suspension while the latter is maintained in a flowable condition at about 140° C., and the tow is then collected on a revolving drum and cooled. The resulting glass-infiltrated tow is then woven into a flexible cloth prepreg material (8-harness satin weave, although other weaves may be used), the material having a width of about 15 cm.

For the fabrication of a reinforced composite panel from this material, 8 sections of prepreg cloth about 7.5 cm by 7.5 cm in size are cut for the panel preform, and are stacked on a stationary tool surface consisting of a flat graphite mold insert resting within a graphite molding cavity. A colloidal graphite coating is provided in the surface of the mold insert as a release aid. Thereafter, a floating graphite tool, consisting of an elongated graphite block 7.5 cm in length which is of trapezoidal cross-section (base —3.2 cm, height —1.3 cm, sidewall length 1.6 cm) is positioned in the molding cavity with its base resting on the prepreg stack.

The tool and panel sheet stack are next covered with prepreg material for the panel support structure (a trapezoidal channel) the material consisting of a stack of 4 additional sheets of the prepreg cloth. These covering sheets are 7.5 cm by 10 cm in size, thus fully covering the floating tool and completely overlapping the panel stack.

After assembling the mold tooling and panel and support prepregs as described, the assembly is covered with a release layer of molybdenum foil and then a hydrostatic pressure forming (HPF) medium is positioned in the mold to cover the assembly. This medium consists of a fused glass/graphite block composed of powdered graphite (Dixon #2 graphite powder) in an alkali borosilicate glass binder (Corning Code 7740 glass), in proportions of 80% graphite and 20% glass by weight.

The resulting assembly is next covered with an upper pressing tool consisting of a graphite mold plunger and is positioned in a unidirectional hot press. The entire assembly is then heated to a temperature of about 750° C. while under a pressure of 25 psi, further heated to 950° C. with pressure increasing to 2000 psi, further heated to 1340° C. and maintained there for 10 minutes at the same pressure, then cooled to 850° C. with pressure decreasing during cooling to 25 psi, and finally cooled to room temperature prior to complete pressure release.

Following cooling the mold assembly is opened and the consolidated composite structure is removed. The floating tool is then removed from the consolidated composite structure by multiple drilling through the tool along its long axis and then breaking out any remaining graphite material.

Examination of the composite structure thus provided indicates that full consolidation of the composite material and complete crystallization of the glass-ceramic matrix in both the panel and support structures have been achieved. Also excellent integration of the support channel structure into the composite panel is observed. Some structural cracking is seen along the channel base and at the upper corners of the channel, but this is attributed to the substantial fiber realignment occurring during consolidation and the relatively high viscosity of the glass matrix material employed. These effects can be minimized or eliminated though modification of the stacking arrangement used to incorporate the floating tool in the prepreg material and/or through modifications in the consolidation characteristics of the fiber or matrix compositions employed.

The following example illustrates one procedure useful for eliminating cracking defects even in relatively large trapezoidal support channels.

EXAMPLE 2

Prepreg fiber tow for the manufacture of composite cloth is prepared substantially as described in Example 1, except that the Nicalon silicon oxycarbide fiber tows used are provided with a pyrolytic carbon release coating prior to infiltration with the powdered glass. This coating is applied by the application and subsequent pyrolysis of an organic solution on the fibers, as described in copending U.S. patent application Ser. No. 07/314,451 filed Feb. 23, 1989 (now U.S. Pat. No 5,039,635), incorporated herein by reference, although other methods of carbon coating the fibers may alternatively be used.

A panel preform assembly incorporating cloth made from the glass-infiltrated fiber tow above described is thereafter prepared by stacking sheets around a floating tool as described in Example 1. However, in order to reduce interlaminar slipping of the prepreg cloth and fibers during consolidation of the preform assembly, the green prepreg sheets for the panel and covering support member are stitched together along both edges of the base of the floating tool. This conforms the green prepreg sheets more closely to the floating tool prior to the initiation of consolidation, thus reducing the amount of slippage needed later to fully conform the composite material to the tool shape.

Consolidation of the stitched preform comprising the carbon-coated reinforcing fibers is then carried out as described in Example 1, and again full consolidation and crystallization of the composite preform material are achieved. In this case, however, complete integration of the channel support into the panel structure is accomplished without any evidence of crack defects at the corners of the channel. Thus a stiffened panel with integral channeled support member, exhibiting high strength and density yet being free of extraneous sealing materials and cemented joints, is provided in a single hot pressing step.

Figure 5:
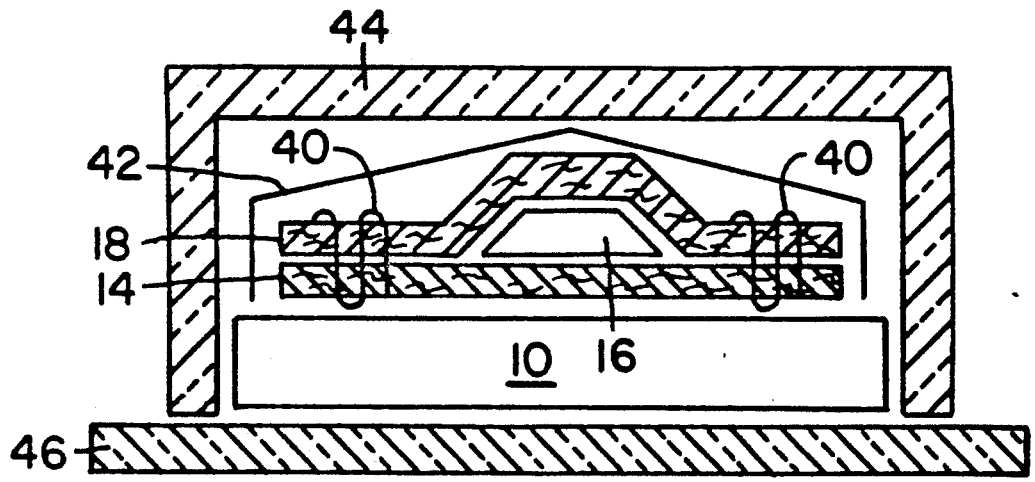
FIG. 5 schematically illustrates an assembly for the hot isostatic pressing of an integrally stiffened composite panel in accordance with the invention.

An illustration of a preform assembly which could be used to provide defect-free consolidation as above described is provided in FIG. 5 of the drawing. FIG. 5 is a schematic cross-sectional illustration, not in true proportion or to scale, showing covering green prepreg sheets 18 for the support member which have been fastened to green prepreg sheets 14 for the panel by means of stitching 40. This stitching provides excellent conformance between prepreg sheets 14 and 18 and floating tool 16 positioned therebetween.

The assembly of FIG. 5 also illustrates features particularly useful where the consolidation of the integrally stiffened panel is to be accomplished by means of hot isostatic pressing instead of hydrostatic pressure forming. As further shown in FIG. 5, prepreg sheets 14 and 18, which are resting on graphite mold base 10 and covered by a thin sheet of release material 42 composed for example of molybdenum foil, are in turn covered by a glass container or cover 44. This cover rests on a glass base plate 46 which together with glass cover 44 forms a glass enclosure or "glass can" around the prepreg assembly and associated graphite tooling.

During subsequent hot isostatic pressure processing of this assembly, initial heating thereof under vacuum causes glass cover 44 to seal to glass base 46, thus sealing the prepreg sheets and tooling into a gas-tight chamber. Further heating of the collapsed can and assembly at high temperatures under high gas pressure then results in the collapse of the can elements to form a gas-tight membrane around the sheets and tooling, followed by the complete consolidation of the prepreg panel and support sheets around the floating tool to provide an integrally stiffened panel assembly of high density and rigidity.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A method for the manufacture of a ceramic matrix composite panel incorporating an integral composite support member which comprises the steps of:
   providing composite material for a panel preform and a support preform, the material being comprised of green ceramic sheet formed of inorganic fibers pre-impregnated with powdered glass:
   providing a floating refractory forming tool, the tool comprising a shaping surface configured for shaping green ceramic sheet into an integral support member of a selected support configuration;
   combining the panel preform, support preform and floating tool into an assembly wherein at least a portion of the support preform is in contact with the surface of the panel preform, and wherein the shaping surface of the floating tool is in contact with and supports the support preform in approximately said selected support configuration;
   fastening the support preform to the panel preform at points adjacent to the floating tool to conform the preforms more closely to the floating tool;
   heating the assembly to a temperature at least sufficient to soften the powdered glass while applying pressure to the assembly, the pressure being at least sufficient to fuse the support preform to the panel preform, to shape the support preform against the floating tool into an integral support member of the selected support configuration, and to consolidate the fused panel preform and support preform into a dense ceramic composite structure comprising a panel with an integral support member, and
   removing the floating tool from the ceramic composite structure.

2. A method in accordance with claim 1 wherein, prior to the step of heating and applying pressure to the assembly, the panel preform is positioned against a rigid refractory panel former.

3. A method in accordance with claim 2 wherein the shaping surface of the floating tool is configured to shape the support preform into a raised rib fused to and projecting from the panel.

4. A method in accordance with claim 2 wherein the shaping surface of the floating tool is configured to shape the support preform into a closed channel wall fused to and extending parallel with the panel surface.

5. A method in accordance with claim 2 wherein the pressure applied to the assembly is hydrostatic pressure.

6. A method in accordance with claim 5 wherein the rigid refractory panel former is a flat or slightly curved surface.

7. A method in accordance with claim 2 wherein the pressure applied to the assembly is isostatic gas pressure.

8. A method in accordance with claim 7 wherein the rigid refractory panel former is positioned within a molding cavity.

9. A method in accordance with claim 7 wherein, prior to the application of isostatic gas pressure thereto, the assembly is sealed with in a deformable pressure envelope.

10. A method in accordance with claim 9 wherein the pressure envelope is a sealed glass envelope.

11. A method in accordance with claim 9 wherein at least the surface of the panel former is composed of graphite.

12. A method in accordance with claim 9 wherein the isostatic pressure is applied through a hydrostatic pressure medium disposed with panel former and assembly in the molding cavity.

13. A method for the manufacture of a ceramic matrix composite panel incorporating an integral channeled support on the panel surface which comprises the steps of:
   providing material for a panel preform and support preform, the material comprising green ceramic sheet formed of inorganic fibers pre-impregnated with powdered glass;
   providing a refractory floating tool having a cross-sectional shape selected to correspond to a bore shape for the integral channeled support;
   positioning the panel preform on a rigid refractory panel former;
   positioning the refractory floating tool on the panel preform at a location selected for additional panel support;
   overlaying the floating tool and at least immediately adjoining portions of the panel preform with the support preform, thus to provide an assembly of the panel preform, forming tool, and support preform;
   fastening the support preform to the panel preform at points adjacent to the floating tool, thus to conform the support preform more closely to the bore shape;
   heating the assembly at a temperature at least sufficient to soften the powdered glass while applying isostatic pressure to the assembly, the isostatic pressure being at least sufficient to fuse the support preform to the panel preform, to shape the support preform around the floating tool, and to consolidate the fused panel and channeled support into a dense ceramic composite panel; and
   removing the forming tool form the channeled support structure.

14. A method in accordance with claim 13 wherein the hydrostatic pressure medium is composed at lest predominantly of a mixture of glass and particulate graphite which is solid at room temperature.

15. A method in accordance with claim 14 wherein the refractory floating tool is composed of graphite.

* * * * *